(12) United States Patent
Watanabe et al.

(10) Patent No.: US 7,119,151 B2
(45) Date of Patent: Oct. 10, 2006

(54) ANTIMICROBIAL AGENT AND PRODUCTION PROCESS THEREOF

(75) Inventors: Haruo Watanabe, Kanagawa (JP); Yasuhito Inagaki, Kanagawa (JP); Tsutomu Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 10/739,108

(22) Filed: Dec. 19, 2003

(65) Prior Publication Data

US 2006/0128864 A1 Jun. 15, 2006

Related U.S. Application Data

(62) Division of application No. 09/794,004, filed on Feb. 28, 2001.

(30) Foreign Application Priority Data

Mar. 10, 2000 (JP) ............................ P2000-072514

(51) Int. Cl.
*C08F 8/42* (2006.01)
(52) U.S. Cl. ................ 525/340; 525/329.2; 525/329.3; 525/344; 525/370; 525/371; 525/372; 525/373
(58) Field of Classification Search ................ 525/340, 525/344, 370, 371, 372, 373
See application file for complete search history.

(56) References Cited

U.S. PATENT DOCUMENTS

| | | | |
|---|---|---|---|
| 3,553,160 A | | 1/1971 | Schroeder |
| 3,734,897 A | * | 5/1973 | Stoy .................... 210/500.25 |
| 3,878,177 A | | 4/1975 | Matsumara et al. |
| 3,953,545 A | * | 4/1976 | Stoy ............................ 521/27 |
| 4,139,515 A | * | 2/1979 | Dennington ............. 106/15.05 |
| 4,143,203 A | | 3/1979 | Rigopulos et al. |
| 4,448,935 A | * | 5/1984 | Iovine et al. ................ 525/343 |
| 4,604,420 A | | 8/1986 | Sato |
| 5,994,423 A | * | 11/1999 | Inagaki et al. ............... 521/134 |
| 6,022,928 A | * | 2/2000 | Inagaki et al. ........... 525/332.9 |
| 6,143,835 A | * | 11/2000 | Capone et al. ........... 525/329.1 |
| 6,190,575 B1 | * | 2/2001 | Inagaki et al. ............... 210/728 |
| 6,245,862 B1 | * | 6/2001 | Rajagopalan ............... 473/373 |
| 6,261,461 B1 | * | 7/2001 | Inagaki et al. ............... 204/194 |
| 6,274,681 B1 | * | 8/2001 | Inagaki et al. ........... 525/333.5 |
| 6,348,545 B1 | * | 2/2002 | Inagaki et al. ............... 525/261 |
| 6,380,349 B1 | * | 4/2002 | Rajagopalan ............. 206/315.3 |
| 6,417,288 B1 | * | 7/2002 | Inagaki et al. ........... 525/333.5 |
| 2002/0016419 A1 | * | 2/2002 | Inagaki et al. ............... 525/344 |
| 2002/0039629 A1 | * | 4/2002 | Inagaki et al. ............. 428/35.2 |

FOREIGN PATENT DOCUMENTS

| | | |
|---|---|---|
| EP | 0 220 612 | 5/1987 |
| EP | 0 286 243 | 10/1988 |
| EP | 0 575 882 | 12/1993 |
| EP | 0 641 805 | 3/1995 |
| EP | 818474 A2 * | 1/1998 |
| FR | 2 033 922 | 12/1970 |
| GB | 2 300 368 | 11/1996 |
| JP | 06 001932 | 1/1994 |
| WO | 99 51651 | 10/1999 |

OTHER PUBLICATIONS

Whelan, "Polymer Technology Dictionary", 2nd ed., Chapman & Hall, New York, p. 14 (1994).*

* cited by examiner

*Primary Examiner*—Bernard Lipman
(74) *Attorney, Agent, or Firm*—Rader, Fishman & Grauer PLLC; Ronald P. Kananen

(57) ABSTRACT

An antimicrobial agent utilizes a resin having acrylonitrile and styrene and/or a conjugated diene as units. The antimicrobial agent includes a metal-salt-containing copolymer, and the metal-salt-containing copolymer is obtained by treating a copolymer containing acrylonitrile and at least one of styrene and a conjugated diene as units with an acid to thereby introduce acid radicals into the copolymer, and converting at least part of the acid radicals into a salt of at least one metal selected from among Ag, Cu, and Zn.

14 Claims, No Drawings

ANTIMICROBIAL AGENT AND PRODUCTION PROCESS THEREOF

This Application is a Divisional Application of Ser. No. 09/794,004 filed Feb. 28, 2001.

BACKGROUND OF THE INVENTION

1. Field of the Invention

The present invention relates to a novel antimicrobial agent which is prepared by using a copolymer derived from, for example, a spent resin, and to a production process of the antimicrobial agent.

2. Description of the Related Art

Antimicrobial agents for suppressing the growth of bacteria and/or fungi include inorganic antimicrobial agents, organic antimicrobial agents extracted from natural products, organic antimicrobial agents composed of aliphatic compounds, and organic antimicrobial agents composed of aromatic compounds.

Such inorganic antimicrobial agents include, for example, sodium hypochlorite, and other chlorine compounds; hydrogen peroxide, and other peroxides; boric acid, sodium borate, and other borate compounds; copper sulfate, and other copper compounds; zinc sulfate, zinc chloride, and other zinc compounds; sulfur, calcium polysulfate, sulfur hydrate, and other sulfur substances; calcium oxide, and other calcium compounds; silver thiosulfite complex, silver nitrate, and other silver compounds; as well as iodine and sodium silicofluoride.

The organic antimicrobial agents extracted from natural products include, but are not limited to, hinokitiol, *Phyllostachys pubescens* extract, and creosote oil.

The organic antimicrobial agents composed of aliphatic compounds include, but are not limited to, tributyltin oxide, and other organotin compounds; copper naphthenate, and other cyclopentane derivatives; methyl bromide, and other halides; ethyl alcohol, isopropyl alcohol, and other monohydric alcohols; 2-bromo-2-nitro-1,3-propanediol, and other dihydric alcohols; formaldehyde, glutaraldehyde, and other saturated aldehydes; sorbic acid, potassium sorbate, and other carboxylate compounds; ethylene oxide, propylene oxide, and other ether compounds; beta-oxypropiolactone, and other lactone compounds; 3-trimethoxysilylpropyldimethyloctadecylammo-nium chloride, and other quaternary ammonium salt compounds; di(octylaminoethyl)glycine hydrochloride, and other amino acid derivatives; sodium lauryl sulfate, and other sulfonic acid compounds; bisdequalinium acetate, and other hydroxamic acid compounds; isocyanuric chloride, and other cyanuric acid compounds; methyl isocyanate, and other cyanic acid compounds; bis (trichloromethyl)sulfone, and other sulfone compounds; polyhexamethylenebiguanidine hydrochloride, and other guanidine compounds; 1,3-dichloro-5,5-dimethylhydantoin, and other hydantoin compounds; 5-oxy-3,4-dichloro-1,2-dithiol, and other dithiol compounds; iron methylarsinate, and other arsine compounds; tris(ethylphosphate)aluminium, and other phosphate compounds; and thiocarbamide compounds.

The organic antimicrobial agents composed of aromatic compounds include, but are not limited to, bis(4-nitrophenyl) carbonate, and other carbonate compounds; benzalkonium chloride, benzethonium chloride, and other quaternary ammonium salt compounds; 2,6-dichloro-4-nitroaniline, and other monoamine compounds; potassium nitroethylbenzylethylenediamine, and other diamine compounds; aluminium N-nitroso-N-cyclohexylhydroxylamin-e, and other hydroxylamine compounds; dihydromethyloxathiinecarboxanilide dioxide, and other anilide compounds; 2-(4-thiazolyl)benzimidazole, and other imidazole compounds; 5-methyl-1,2,4-triazol-3,4-benzothiazole, and other benzothiazole compounds; 2,4-dichloro-6-chloroanilino-1,3,5-triazin-e, and other triazine compounds; chlorhexidine hydrochloride, chlorhexidine gluconate, and other guanidine compounds; cetylpyridinium chloride, and other pyridine compounds; dimethylpyrazolylhydroxyphenylpyr-imidine, and other pyrimidine compounds; 2,2'-methylenebis-3,4,6-trichloro-phenol, and other halogenobenzene compounds; copper hydroxynonylbenzenesulfonate, and other benzenesulfonate compounds; benzoic acid, and other benzenecarboxylic acid compounds; thimerosal, and other mercaptocarboxylic acid compounds; ethyl hydroxybenzoate, and other hydroxycarboxylic acid compounds; phenol, cresol, and other monohydric phenol compounds; resorcinol, and other dihydric phenol compounds; phenoxyethanol, and other phenoxy ether compounds; pentachlorophenyl laurate, and other phenol ester compounds; triphenyltin oxide, and other phenyl compounds; diphenyl, and other biphenyl compounds; beta-naphthol, and other monohydric naphthols; monochloronaphthalene, and other naphthalene compounds; dodecylisoquinolinium bromide, and other isoquinoline compounds; as well as nitrile compounds, isothiazole compounds, thiadiazole compounds, halogenophenol compounds, pyrrole compounds, quinone compounds, quinoline compounds, and organic phosphoric ester compounds.

However, there has been no antimicrobial agent using an ABS resin, or another resin, whereas the above types of antimicrobial agents are typically used. Resins each containing acrylonitrile and styrene and/or a conjugated diene are classified as polystyrenic resins such as ABS resins, SAN resins, and AAS resins, and as synthetic rubbers such as NBR rubbers. These resins are relatively low in cost. Particularly, the former polystyrenic resins are excellent in rigidity, dimensional stability, workability, and other properties and are widely used as materials for covers and casings for various applications, housings, and other parts of electric equipment and automobiles, and as other resinous materials. The latter synthetic rubbers are widely used as tubes, hoses, and various cushioning materials.

Under these circumstances, these materials are expected to be used in further broader applications and demands are made to improve these materials to those having higher added values. In other words, these materials are now used in the aforementioned applications alone and are not used as antimicrobial agents.

Additionally, products obtained by using the above resins yield a large quantity of spent resins as discarded materials with an increasing production. The amount of discarded materials composed of these materials tends to increase in recent years, and there are increasing demands to make effective use of such discarded materials from the viewpoint of global environmental conservation.

SUMMARY OF THE INVENTION

Accordingly, it is a first object of the present invention to provide a novel antimicrobial agent using a resin containing acrylonitrile and styrene and/or a conjugated diene as units and to provide a production process thereof.

An antimicrobial agent according to the present invention includes a metal-salt-containing copolymer, the metal-salt-containing copolymer is obtained by treating a copolymer with an acid to thereby introduce acid radicals into the copolymer, which copolymer includes acrylonitrile and at least one of styrene and a conjugated diene as units, and converting at least part of the acid radicals into a metal salt. In the copolymer, at least part of the acid radicals are preferably converted into a salt of at least one metal selected from Ag, Cu, and Zn.

The invented antimicrobial agent having the above configuration includes a metal salt as at least part of acid radicals introduced into a copolymer and is rendered antimicrobial. In other words, the present invention can impart antimicrobial property to the resulting copolymer by the introduction of a metal salt into the copolymer and can provide a novel antimicrobial agent.

A second object of the present invention is to make effective use of resources by reusing spent resins. Specifically, the invented antimicrobial agent may include the copolymer composed of a spent resin.

In a third aspect, the present invention provides a process for producing an antimicrobial agent. The process includes the steps of treating a copolymer containing acrylonitrile and at least one of styrene and a conjugated diene as units with an acid to thereby introduce acid radicals into the copolymer; and converting at least part of the acid radicals into a salt of at least one metal selected from among Ag, Cu, and Zn.

The invented process for producing an antimicrobial agent having the above configuration can impart antimicrobial property to the copolymer by subjecting the copolymer to an acid treatment step and then to a conversion step into a metal salt (hereinafter briefly referred to as "conversion step").

The invented process for producing an antimicrobial agent as the third object of the invention may prepare the copolymer using a spent resin. In this embodiment, the present invention can make effective use of resources by reusing spent resins.

DESCRIPTION OF THE PREFERRED EMBODIMENTS

The present invention will now be illustrated in further detail with reference to embodiments of the invented antimicrobial agents and production process thereof.

The antimicrobial agent according to the present invention is composed of a copolymer containing acrylonitrile and styrene and/or a conjugated diene (e.g., butadiene or isoprene) as units. Specifically, the copolymer in the antimicrobial agent comprises acrylonitrile and styrene as units, comprises acrylonitrile and a conjugated diene as units, or comprises acrylonitrile, styrene and a conjugated diene as units.

In the production of the antimicrobial agent, the copolymer is initially subjected to an acid treatment step in which the copolymer is treated with an acid to thereby introduce acid radicals into the copolymer. The acid radicals are introduced into the styrene and/or conjugated diene moiety of the copolymer. Additionally, the acrylonitrile moiety of the copolymer is hydrolyzed in the acid treatment step. The acrylonitrile moiety is amidated through hydrolysis to thereby impart hydrophilicity to the copolymer.

Subsequent to the acid treatment step, the copolymer having introduced acid radicals and being hydrolyzed is subjected to the conversion step to thereby convert part or overall of the acid radicals into a salt of a metal selected from among Ag, Cu, and Zn. The copolymer is converted into a metal-salt-containing copolymer having antimicrobial property by the introduction of a metal salt through the conversion step. The metal-salt-containing copolymer after the conversion step is in a gel state and is subjected to a drying step to thereby yield an antimicrobial agent. Such drying operations include, for example, solar drying, baking, drying under reduced pressure, centrifugal drying, and press drying.

The antimicrobial agent preferably comprises the units, acrylonitrile and styrene and/or a conjugated diene, in a predetermined proportion from the viewpoints of antimicrobial activities and easiness to handle. Specifically, the copolymer comprises the acrylonitrile unit in a proportion of preferably 5 to 80% by mole, more preferably 10 to 60% by mole, and most preferably 20 to 50% by mole.

If the content of acrylonitrile is less than 5% by mole, the copolymer after acid treatment step may become soluble in water and such a water-soluble copolymer is difficult to handle in subsequent steps. In contrast, if the acrylonitrile content exceeds 80% by mole, the resulting copolymer may become rigid and cannot be crushed into pieces and is difficult to handle. Additionally, the content of styrene and/or a conjugated diene is relatively decreased, and sites to which acid radicals are introduced are decreased to thereby decrease antimicrobial activities in some cases.

The copolymer comprises the styrene and/or conjugated diene unit in a proportion of preferably 20 to 95% by mole, more preferably 45 to 85% by mole, and most preferably 50 to 80% by mole.

If the content of the styrene and/or conjugated diene unit is less than 20% by mole, sites to which acid radicals are introduced are decreased to thereby decrease antimicrobial activities in some cases. Additionally, the resulting copolymer becomes rigid and cannot be crushed into pieces and is difficult to handle. In contrast, if the content of the styrene and/or conjugated diene unit exceeds 95% by mole, the copolymer after acid treatment step may become soluble in water and such a water-soluble copolymer is difficult to handle in subsequent steps.

The copolymer for use in the invention may further comprise additional units in addition to the acrylonitrile unit, styrene unit, and conjugated diene unit. Such additional units include, but are not limited to, maleic anhydride, itaconic anhydride, α-methylstyrene, acrylamide, methacrylamide, acrylic acid and acrylic esters (e.g., saturated or unsaturated hydrocarbons each having 1 to 10 carbon atoms), methacrylic acid and methacrylic esters (e.g., saturated or unsaturated hydrocarbons each having 1 to 10 carbon atoms), vinyl acetate, vinyl chloride, ethylene, propylene, butylene, vinylpyrrolidone, and vinylpyridine.

The copolymer has a weight average molecular weight (Mw) of preferably 1000 to 20000000, and more preferably 10000 to 1000000. If Mw is less than 1000, the resulting copolymer may become soluble in water in the acid treatment step and the subsequent conversion step, and desired antimicrobial activities may not be obtained. In contrast, if Mw exceeds 20000000, reaction rates in the acid treatment step and the subsequent conversion step are decreased and the process is not practically desirable.

As the copolymer, use can be made of resinous materials such as an acrylonitrile-butadiene-styrene resin (hereinafter referred to as "ABS resin"), a styrene-acrylonitrile resin (hereinafter referred to as "SAN resin"), an acrylate-styrene-acrylonitrile resin (hereinafter referred to as "ASA resin"), a polyethylene chloride-acrylonitrile-styrene resin (hereinafter referred to as "ACS resin"), and an acrylonitrile-butadiene rubber (hereinafter referred to as "NBR rubber"). These resinous materials may be any of "virgin pellets" newly produced, discharged articles (odd products) discharged in production procedures of resin materials or molded articles, and spent resinous materials. Such spent resinous materials have been molded for a specific application and are derived from housings and various parts materials used in, for example, electric products and automobiles or from tubes, hoses, and various cushioning materials.

Spent resinous materials as above are particularly preferably used as the copolymer. Such spent resinous materials can be obtained from discharging sites such as plants, shops, and consumers. Especially, most of spent resinous materials recovered from plants and shops are more uniform in composition than spent resinous materials discharged from consumers as general waste and are preferably used as the copolymer.

The copolymer for use in the invention may be alloys with other resinous materials and may be copolymers further including additives such as pigments, dyes, stabilizers, flame-retardants, plasticizers, fillers, and auxiliaries. Alternatively, the copolymer may be a mixture of a spent resinous material and a virgin pellet.

Additional resins which can be mixed with the copolymer for use herein are preferably resins that do not adversely affect individual reactions in the acid treatment step and the conversion step. Such resins include, for example, poly (phenylene ether), polycarbonates, poly(phenylene sulfide), poly(ethylene terephthalate), poly(butylene terephthalate), polyamides, and polyesters. The content of the additional resin in the antimicrobial agent is preferably 60% by weight or less relative to the copolymer. A content of the additional resin exceeding 60% by weight may inhibit individual reactions in the acid treatment step and the conversion step.

The copolymer is preferably processed into pieces as a pretreatment of the acid treatment step. Techniques for processing the copolymer into pieces are as follows.

(1) Grinding with a grinder and then sieving It is advantageous to grind after freezing when the copolymer comprises a rubber component.

(2) Heating and melting the copolymer to thereby pelletize the same into fine beads The pieces of the copolymer preferably have a size of 3.5 mesh or less. If the copolymer has a size exceeding 3.5 mesh, the copolymer has a small surface area and is resistant to acid treatment, resulting in an increasing reaction time. Accordingly, if the copolymer has a size exceeding 3.5 mesh, the amount of introduced acid radicals is decreased and the property of carrying a metal salt may be substantially decreased.

Additionally, the copolymer should preferably further comprise an inorganic pigment such as carbon black and titanium dioxide. When the copolymer comprises an inorganic pigment, the inorganic pigment is detached from the copolymer during the acid treatment step, and the acid is facilitated to permeate to a surface of the copolymer and the periphery of portions where the inorganic pigment is detached becomes sensitive to acid treatment. By this configuration, the acid treatment of the copolymer is enhanced.

The content of the inorganic pigment is preferably 0.01 to 20% by weight, and more preferably 0.05 to 10% by weight relative to the dry weight of the copolymer. If the content of the inorganic pigment is less than 0.01% by weight, the effect of enhancing the acid treatment as mentioned above may not be exhibited. In contrast, if the content of the inorganic pigment exceeds 20% by weight, the proportion of the copolymer component having antimicrobial activities is relatively decreased and desired antimicrobial activities may not be exhibited.

The inorganic pigment such as carbon black and titanium dioxide may be originally contained in the copolymer or may be independently added to and mixed with the copolymer. Particularly from the viewpoint of improving properties of the antimicrobial agent, the inorganic pigment should be preferably originally contained in the copolymer. Such inorganic pigments such as carbon black and titanium dioxide for use in the invention may be those generally used in plastics as coloring agents, reinforcing agents, and materials for imparting electric conductivity.

For example, the carbon black may be any of carbon black produced by channel technique, furnace technique, and thermal technique. Each of these carbon black products can be used alone or in combination. The carbon black has a mean particle size of preferably 5 to 500 nm, and more preferably 10 to 50 nm.

The titanium dioxide may be any of rutile type titanium dioxide, anatase type titanium oxide, and ultrafine titanium dioxide. Each of these types of titanium dioxide can be used alone or in combination. The titanium dioxide has a mean particle size of preferably 0.01 to 50 nm, and more preferably 0.05 to 10 nm.

Inorganic acids are advantageously used as acids for use in the acid treatment step. The amount of the inorganic acid is preferably 1 to 500 times by weight and more preferably 10 to 200 times by weight that of the copolymer to be treated with the acid. If the amount of the inorganic acid is less than once that of the copolymer, the amount of the acid radical introduced into styrene and/or conjugated diene unit and the rate of hydrolyzed acrylonitrile group are decreased, and the amount of the metal salt contained in the copolymer may be insufficient from the viewpoint of antimicrobial activities. In contrast, if it exceeds 500 times, an excessive amount of the inorganic acid is used to thereby increase cost, and is not desirable in practice.

Such inorganic acids include a concentrated sulfuric acid, sulfuric anhydride, fuming sulfuric acid, chlorosulfonic acid, and other sulfonating agents, as well as nitric acid, fuming nitric acid, phosphoric acid, phosphorus chloride, and phosphorus oxide. Among them, concentrated sulfuric acid, sulfuric anhydride, fuming sulfuric acid and chlorosulfonic acid are preferred, of which a concentrated sulfuric acid of 70% by weight or more is specifically preferred.

Each of these inorganic acids can be used alone or in combination. When they are used in combination, a plurality of inorganic acids may be previously mixed or a plurality of inorganic acids may be added in turn. For example, the copolymer is initially treated with a concentrated sulfuric and sulfuric anhydride is added to the treated copolymer to thereby yield an antimicrobial agent which is stable in shape in an aqueous system. This is because the treatment with concentrated sulfuric acid mainly hydrolyzes a nitrile moiety of the copolymer, and the subsequent treatment with sulfuric anhydride forcefully subjects a styrene or conjugated diene moiety to sulfone-crosslinking to thereby yield a copolymer as a highly crosslinked gel.

The acid treatment step may be performed in an inorganic acid as well as in a system with an organic solvent. Such organic solvents for use herein include aliphatic halogenated hydrocarbons having one or two carbon atoms such as 1,2-dichloroethane, chloroform, dichloromethane, and 1,1-dichloroethane; alicyclic hydrocarbons such as cyclohexane, methylcyclohexane, and cyclopentane; nitromethane, nitrobenzene, sulfur dioxide, paraffin-series hydrocarbons (e.g., those having one to seven carbon atoms) acetonitrile, carbon disulfide, tetrahydrofuran, 1,2-dimethoxyethane, acetone, methyl ethyl ketone, and thiophene. Of these organic solvents, preferred are aliphatic halogenated hydrocarbons having one or two carbon atoms, alicyclic hydrocarbons, nitromethane, nitrobenzene, and sulfur dioxide. Each of these solvents can be used alone or in combination. These organic solvents can be mixed in any proportion.

The proportion of the organic solvent is preferably less than 200 times by weight that of the copolymer. An amount of the organic solvent exceeding 200 times by weight may decrease the reaction rate of acid treatment and may deteriorate economical efficiency.

Where necessary, a Lewis acid can be used in acid treatment of the copolymer. Such Lewis acids include triethyl phosphate, trimethyl phosphate, and other alkyl phosphates, dioxane, acetic anhydride, ethyl acetate, ethyl palmitate, diethyl ether, and thioxane. An inorganic acid or organic solvent used in the acid treatment step can be supplied again to a reaction by recovering after the completion of the reaction and recycling to the reaction as intact, or by recovering through extraction or distillation.

The above acid treatment of the copolymer can introduce acid radicals into the styrene and/or conjugated diene moiety of the copolymer and can amidate acrylonitrile moiety through hydrolysis to thereby modify the copolymer to a hydrophilic resin. Such acid radicals introduced into the styrene and/or conjugated diene moiety include, for example, sulfonic acid group, —$PO(OH)_2$, and —$CH_2PO(OH)_2$.

Specifically, to introduce sulfonic acid group as the acid radical, the copolymer is allowed to react with the sulfonating agent such as concentrated sulfuric acid, sulfuric anhydride, fuming sulfuric acid, or chlorosulfonic acid directly or in a solvent. To introduce —$PO(OH)_2$ group, phosphorus trioxide is added to the solvent to thereby further enhance hydrolysis. Of these acid radicals, sulfonic acid group is specifically preferred. Each of these acid radicals can be introduced alone or in combination into the copolymer.

The amount of the acid radical in the copolymer is preferably 5 to 95% by mole, and more preferably 10 to 70% by mole, relative to the total units. If the amount of the acid radical exceeds 95% by mole relative to the total units, the acid-treated copolymer may become soluble in water, resulting in deteriorated dimensional stability of the product antimicrobial agent. In contrast, the amount less than 5% by mole relative to the total units may deteriorate water permeability and water absorbing property (especially to aqueous electrolyte solutions) of the copolymer and may inhibit treatment with a metal salt in the metal salt treatment step, resulting in deteriorated antimicrobial activities.

Depending greatly on the presence or absence of the organic solvent, a reaction temperature in the acid treatment step should preferably fall in a range from 0° C. to 200° C. and more preferably in a range from 30° C. to 120° C. If the reaction temperature is lower than 0° C., the reaction rate is impracticably decreased and the resulting antimicrobial agent may not exhibit satisfactory performances. If it exceeds 200° C., molecular chains of the copolymer are liable to be cleaved through thermal decomposition and the resulting copolymer may become soluble in water.

The reaction in the acid treatment step should be preferably performed for 1 minute to 40 hours, and more preferably for 5 minutes to 2 hours, while depending greatly on the reaction temperature. If the reaction time is less than 1 minute, the reaction may not sufficiently proceed. If it exceeds 40 hours, the production efficiency may be deteriorated.

In the conversion step, the acid radical moiety of the copolymer having acid radicals introduced in the acid treatment step is converted into a metal salt of at least one metal selected from Ag, Cu, and Zn. The acid radical can be converted into a metal salt, for example, by filtrating the reaction product obtained in the acid treatment step through a filter, washing the filtered product with a large quantity of water, and then adding a metal salt to the product, or by directly adding the product obtained n the acid treatment step to an aqueous solution of the metal salt. By these techniques, part or overall of the acid radicals introduced in the acid treatment step can be converted into a metal salt.

Organic salts, inorganic salts, organic hydroxides, and inorganic hydroxides can be used in combination with these metal salts in the conversion step. Such organic salts, inorganic salts, organic hydroxides, and inorganic hydroxides include, but are not limited to, hydroxides, carbonates, acetates, sulfates; phosphates, salts of organic acids, and other compounds of ammonium, alkali metals (e.g., sodium, lithium, and potassium), alkaline earth metals (e.g., magnesium and calcium), and other metals (e.g., aluminium, titanium, germanium, tin, and iron).

The above antimicrobial agent, in which part or overall of the acid radicals introduced into the copolymer are converted into a specific metal salt, can effectively inhibit growth and reproduction of bacteria, fungi, and other microorganisms. The antimicrobial agent can be produced by using a spent resinous material as described above. Accordingly, the present invention can add values to waste materials which have been conventionally discarded, can effectively utilize the wasted materials to thereby make effective use of resources.

The invented antimicrobial agent can be used in combination with a conventionally known antimicrobial agent. Such conventional antimicrobial agents include inorganic antimicrobial agents, organic antimicrobial agents extracted from natural products, organic antimicrobial agents composed of aliphatic compounds, and organic antimicrobial agents composed of aromatic compounds.

Such inorganic antimicrobial agents include, but are not limited to, sodium hypochlorite, and other chlorine compounds; hydrogen peroxide, and other peroxides; boric acid, sodium borate, and other borate compounds; copper sulfate, and other copper compounds; zinc sulfate, zinc chloride, and other zinc compounds; sulfur, calcium polysulfate, sulfur hydrate, and other sulfur substances; calcium oxide, and other calcium compounds; silver thiosulfite complex, silver nitrate, and other silver compounds; as well as iodine and sodium silicofluoride.

The organic antimicrobial agents extracted from natural products include, for example, hinokitiol, *Phyllostachys pubescens* extract, and creosote oils.

The organic antimicrobial agents composed of aliphatic compounds include, but are not limited to, tributyltin oxide, and other organotin compounds; copper naphthenate, and other cyclopentane derivatives; methyl bromide, and other halogen compounds; ethyl alcohol, isopropyl alcohol, and other monohydric alcohols; 2-bromo-2-nitro-1,3-propanediol, and other dihydric alcohols; formaldehydes, glutaraldehyde, and other saturated aldehydes; sorbic acid, potassium sorbate, and other carboxylic acid compounds; ethylene oxide, propylene oxide, and other ether compounds; beta-oxypropiolactone, and other lactone compounds; 3 trimethoxysilylpropyldimethyloctadecylammonium chloride, and other quaternary ammonium salt compounds; di(octylaminoethyl)glycine hydrochloride, and other amino acid derivatives; sodium lauryl sulfate, and other sulfonic acid compounds; bisdequalinium acetate, and other hydroxamic acid compounds;

isocyanuric chloride, and other cyanuric acid compounds; methyl isocyanate, and other cyanate compounds; bis (trichloromethyl)sulfone, and other sulfone compounds; polyhexamethylenebiguanidine hydrochloride, and other guanidine compounds; 1,3-dichloro-5,5-dimethylhydantoin, and other hydantoin compounds; 5-oxy-3,4-dichloro-1,2-dithiol, and other dithiol compounds; iron dimethylarsinate, and other arsine compounds; tris(ethylphosphate)aluminium, and other phosphate compounds; and thiocarbamide compounds.

The organic antimicrobial agents composed of aromatic compounds include, but are not limited to, bis(4-nitrophenyl)carbonate, and other carbonate compounds; benzalkonium chlorides benzethonium chloride, and other quaternary ammonium salt compounds; 2,6-dichloro-4-nitroaniline, and other monoamine compounds; potassium nitroethylbenzylethylenediamine, and other diamine compounds; aluminium N-nitroso-N-cyclohexylhydroxylamin-e, and other hydroxylamine compounds; dihydromethyloxathiinecarboxanilide dioxide, and other anilide compounds; 2-(4-thiazolyl)benzimidazole, and other imidazole compounds; 5-methyl-1,2,4-triazol-3,4-benzothiazole, and other benzothiazole compounds; 2,4-dichloro-6-chloroanilino-1,3,5-triazin-e, and other triazine compounds; chlorhexidine hydrochloride, chlorhexidine gluconate, and other guanidine compounds; cetylpyridinium chloride, and other pyridine compounds; dimethylpyrazolylhydroxyphenylpyr-imidine, and other pyrimidine compounds; 2,2'-methylenebis-3,4,6-trichloro-phenol, and other halogenobenzene compounds; copper hydroxynonylbenzenesulfonate, and other benzenesulfonic acid compounds; benzoic acid, and other benzenecarboxylic acid compounds; thimerosal, and other mercaptocarboxylic acid compounds; ethyl hydroxybenzoate, and other hydroxycarboxylic acid compounds; phenol, cresol, and other monohydric phenol compounds; resorcinol, and other dihydric phenol compounds; phenoxyethanol, and other phenoxy ether compounds; pentachlorophenyl laurate, and other phenol ester compounds; triphenyltin oxide, and other phenyl compounds; diphenyl, and other biphenyl compounds; beta-naphthol, and other monohydric naphthols; monochloronaphthalene, and other naphthalene compounds; dodecylisoquinolinium bromide, and other isoquinoline compounds; as well as nitrile compounds, isothiazole compounds, thiadiazole compounds, halogenophenol compounds, pyrrole compounds, quinone compounds, quinoline compounds, and organic phosphate compounds.

The present invention will be illustrated in further detail with reference to the following Examples 1 to 4, which are not intended to limit the scope of the present invention. In these examples, the invented antimicrobial agents were prepared and were evaluated.

EXAMPLE 1

A waste ABS (acrylonitrile-butadiene-styrene) resin was crushed and classified to 16 to 32 mesh with a refrigerating shredder. To 30 parts by weight of a 96% by weight concentrated sulfuric acid, 1 part by weight of the classified waste resin was added, and the resulting mixture was allowed to react at 80° C. for 20 minutes. This waste ABS resin was a black part of a 8-mm cassette tape guard panel and was composed of 52% by mole of styrene, 28% by mole of acrylonitrile, and 20% by mole of butadiene, and further was composed of 2% by weight of carbon black.

After the completion of reaction, a solid matter in the reaction system was filtrated through glass filter, was rinsed, and was neutralized with 50 parts by weight of a 1 N sodium hydroxide solution, and was then washed with sufficient amounts of water. The resulting product was ultimately separated into filtrate and filter cake by filtration. At this stage, silver nitrate was added to the resulting filtrate to find that the filtrate did not become whitish to thereby verify that concentrated hydrochloric acid component was completely removed by neutralization and rinsing.

Next, the filter cake was dispersed in 1000 parts by weight of pure water, and 10 parts by weight of a 1.0 M silver nitrate solution was added to the dispersion and was mixed thoroughly, and the resulting mixture was rinsed and was then filtrated. The resulting solid matter was then dried in a circulation drier at 105° C. for 2 hours to thereby yield an antimicrobial agent composed of a black solid matter.

The resulting antimicrobial agent was subjected to elementary analysis to find that the antimicrobial agent comprised sulfonic acid group in a proportion of 33% by mole relative to total monomeric units and that it comprised silver in a molar ratio of 0.82 relative to the sulfonic acid group.

EXAMPLE 2

An antimicrobial agent was prepared in the same manner as in Example 1, except that a waste SAN (styrene-acrylonitrile) resin and 10 parts by weight of a 1.0 M copper sulfate pentahydrate instead of the waste ABS resin and 10 parts by weight of 1.0 M silver nitrate solution. The resulting antimicrobial agent was found to contain sulfonic acid group in a proportion of 36% by mole relative to the total monomeric units and to contain copper in a molar ratio of 0.91 relative to the sulfonic acid group.

The waste SAN resin was a transparent guard panel part of a 8-mm cassette tape and was composed of 60% by mole of styrene and 40% by mole of acrylonitrile.

EXAMPLE 3

A waste ABS resin was crushed and classified to 16 to 32 mesh with a refrigerating shredder. To 90 parts by weight of a 96% by weight concentrated sulfuric acid, 3.5 parts by weight of the classified resin was added, and allowed to react at 60° C. for 60 minutes. Then, 0.5 part by weight of fuming sulfuric acid ($SO_3$ content: 60% by weight) was added to the mixture and the reaction was continued for further 30 minutes. The resulting reaction mixture was subjected to neutralization and rinsing in the same manner as in Example 1. To the resulting dispersion in the present example, 50 parts by weight of a 1.0 M zinc sulfate heptahydrate was added and the resulting mixture was stirred thoroughly, was rinsed, and was then filtrated. An antimicrobial agent was thus prepared in a similar manner as in Example 1 except the above procedures. The resulting antimicrobial agent according to Example 3 was found to contain sulfonic acid group in a proportion of 42% by mole relative to the total monomeric units and to contain zinc in a molar ratio of 0.85 relative to the sulfonic acid group.

The waste ABS resin was a white housing of a computer and was composed of 48% by mole of styrene, 39% by mole of acrylonitrile, and 13% by mole of butadiene, and was further composed of 1% by weight of titanium dioxide. According to this example, a white antimicrobial agent was obtained.

EXAMPLE 4

Initially, 3 parts by weight of the waste ABS resin used in Example 1 was added to 70 parts by weight of cyclohexane, and 4.2 parts by weight of sulfuric anhydride was added dropwise to the resulting mixture held at 30° C. The mixture was held at a temperature of 30±2° C. and was allowed to react for 2 hours. The resulting solid matter was filtrated and was then rinsed.

The rinsed solid matter was then filtrated and was dispersed in 2000 parts by weight of pure water. To the dispersion, 50 parts by weight of a 1.0 M zinc sulfate heptahydrate and 30 parts by weight of a 1.0 M copper sulfate pentahydrate were added, and the mixture was stirred thoroughly and was rinsed. An antimicrobial agent according to Example 4 was prepared in a similar manner as in Example 1, except for the above procedures. The resulting antimicrobial agent was found to contain sulfonic acid group in a proportion of 25% by mole relative to the total monomeric units and to contain zinc and copper in molar ratios of 0.42 and 0.36, respectively, relative to the sulfonic acid group.

The antimicrobial activities of the above-prepared antimicrobial agents according to Examples 1 to 4 were evaluated in the following manner.

Initially, a test antimicrobial agent was spread on a sterilized Petri dish, and pure water was added dropwise on the antimicrobial agent, and the antimicrobial agent which was in swelling state in equilibrium was allowed to stand for 15 minutes. Excess water was then removed by absorption by a filter paper.

Next, a 0.001% meat extract containing $5 \times 10^5$/ml *Escherichia coli* IFO 3972 was prepared, and 2 ml of the meat extract was added dropwise into the Petri dish, and the Petri dish was covered with a lid and was cultured at 35° C. at relative humidity of 90% or more for 24 hours.

After the completion of cultivation, the culture solution was taken out from the Petri dish, cells of *Escherichia coli* were separated by rinsing and were inoculated on a standard agar plate medium and were cultured at 35° C. for 2 days. On the agar plate medium, living *Escherichia coli* after culture in the Petri dish alone forms colonies, and *Escherichia coli* which was died or suppressed in growth does not form colonies. The number of colonies formed on the agar plate medium after the completion of cultivation was counted and was converted to thereby evaluate the antimicrobial activity of the antimicrobial agent spread in the Petri dish.

*Escherichia coli* which was cultured in a Petri dish without addition of an antimicrobial agent was used as a comparative example (control) in the evaluation of antimicrobial activity.

The results in evaluation are as follows.

The numbers of living colonies of *Escherichia coli* in the Petri dish are shown below.

Comparative Example: $8 \times 10^5$
Example 1: 150
Example 2: 40
Example 3: 90
Example 4: 110

These results show that the antimicrobial agents according to Examples 1 to 4 certainly inhibit growth and reproduction of *Escherichia coli* and sterilize almost all of the microbe in the Petri dish. Accordingly, by converting part or overall of acid radicals in the copolymer into a specific metal salt, antimicrobial activity can be imparted to the copolymer to thereby yield an antimicrobial agent having satisfactory antimicrobial activities.

As is described in detail above, the invented antimicrobial agents, in which at least part of acid radicals formed in the copolymer is converted into a salt of at least one metal selected from Ag, Cu, and Zn, can exhibit satisfactory antimicrobial activities. The present invention can therefore provide completely novel antimicrobial agents using specific copolymers. According to the present invention, such antimicrobial agents can be produced from spent resinous materials, and resources can be effectively utilized, contributing to global environmental conservation.

According to the invented process for producing an antimicrobial agent, acid radicals are introduced into a copolymer and at least part of the acid radicals is converted into a salt of at least one metal selected from Ag, Cu, and Zn. The invented process can therefore produce completely novel antimicrobial agents using specific copolymers. Additionally, spent resinous materials can be used in the invented process, and resources can be effectively utilized, contributing to global environmental conservation.

Other embodiments and variations will be obvious to those skilled in the art, and this invention is not to be limited to the specific matters stated above.

The invention claimed is:

1. A process for producing an antimicrobial agent, comprising the steps of:
   treating a copolymer with an acid to thereby introduce acid radicals into said copolymer, said copolymer containing acrylonitrile and at least one of styrene and a conjugated diene as units; and
   converting at lest part of said acid radicals into a salt of at least one metal selected from the group consisting of Ag, Cu, and Zn.

2. A process according to claim 1, wherein a spent resin is used for the preparation of said copolymer.

3. A process according to claim 1, wherein at least one inorganic acid selected from the group consisting f a concentrated sulfuric acid, sulfuric anhydride, fuming sulfuric acid, chlorosulfonic acid, phosphoric acid, phosphorus chloride, and phosphorus oxide is used in said treating step.

4. A process according to claim 1, where said copolymer is processed to a size of 3.5 mesh or less prior to said acid treatment.

5. A process according to claim 1, wherein said step of treating said copolymer with said acid is performed in a system comprising an organic solvent and an inorganic acid.

6. A process according to claim 1, wherein said metal of said metal-salt is at least one selected from the group consisting of Ag, Cu, and Zn.

7. A process according to claim 1, wherein said metal-salt-containing copolymer comprises 5 to 80% by mole of acrylonitrile.

8. A process according to claim 1, wherein said metal-salt-containing copolymer comprises 20 to 95% by mole of at least one of styrene and a conjugated diene.

9. A process according to claim 1, wherein said copolymer comprises at least one selected from the group consisting of acrylonitrile-butadiene-styrene resins, styrene-acrylonitrile resins, and acrylonitrile-butadiene rubbers.

10. A process according to claim 1, wherein said copolymer further comprises an inorganic pigment.

11. A process according to claim 10, wherein said inorganic pigment is at least one of carbon black and titanium dioxide.

12. A process according to claim 10, wherein said copolymer comprises 0.01 to 20% by weight of said inorganic pigment.

13. A process according to claim 1, wherein at least some of said acid radicals are sulfonic acid groups.

14. A process according to claim 1, wherein said copolymer comprises said acid radicals at a concentration of 5 to 95% by weight relative to the overall units of said copolymer.

* * * * *

UNITED STATES PATENT AND TRADEMARK OFFICE
CERTIFICATE OF CORRECTION

| | | |
|---|---|---|
| PATENT NO. | : 7,119,151 B2 | Page 1 of 1 |
| APPLICATION NO. | : 10/739108 | |
| DATED | : October 10, 2006 | |
| INVENTOR(S) | : Haruo Watanabe et al. | |

It is certified that error appears in the above-identified patent and that said Letters Patent is hereby corrected as shown below:

<u>Column 12</u>
Line 36, "at lest" should read -- at least --.

Line 42, "consisting f a" should read -- consisting of a --.

Signed and Sealed this

Twelfth Day of June, 2007

JON W. DUDAS
*Director of the United States Patent and Trademark Office*